(12) United States Patent
Bishop et al.

(10) Patent No.: US 6,507,421 B1
(45) Date of Patent: Jan. 14, 2003

(54) OPTICAL MONITORING FOR OXC FABRIC

(75) Inventors: David John Bishop, Summit, NJ (US); Randy Clinton Giles, Whippany, NJ (US); David Thomas Neilson, Plainsboro, NJ (US)

(73) Assignees: Lucent Technologies Inc., Murray Hill, NJ (US); Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/414,621

(22) Filed: Oct. 8, 1999

(51) Int. Cl.[7] ................................................. H04J 14/00
(52) U.S. Cl. ....................... 359/117; 359/128; 359/110; 359/124; 359/127; 359/130; 359/159; 385/17; 385/18
(58) Field of Search ................................. 359/117, 128, 359/110, 124, 127, 130, 139, 159; 385/17, 18, 16, 24, 19, 20, 21, 22, 23

(56) References Cited

U.S. PATENT DOCUMENTS

| | | | | |
|---|---|---|---|---|
| 5,436,986 A | * | 7/1995 | Tsai ............................. | 385/16 |
| 6,292,281 B1 | * | 9/2001 | Bala et al. ................... | 359/110 |
| 6,301,402 B1 | * | 10/2001 | Bhalla et al. ................. | 386/16 |
| 6,330,380 B1 | * | 12/2001 | Young et al. ................. | 385/17 |
| 6,363,182 B2 | * | 3/2002 | Milles et al. ................. | 385/17 |
| 6,366,716 B1 | * | 4/2002 | Graves ......................... | 385/17 |
| 6,396,975 B1 | * | 5/2002 | Wood et al. .................. | 385/18 |

* cited by examiner

*Primary Examiner*—Leslie Pascal
*Assistant Examiner*—Hanh Phan
(74) *Attorney, Agent, or Firm*—Cohen, Pontani, Lieberman & Pavane

(57) ABSTRACT

An optical crossconnect (OXC) fabric including an array of tiltable mirrors, a reflector and a plurality of optical fibers controls the position of the mirrors to optimize the transfer of a signal between an input optical fiber and an output optical fiber by monitoring the optical signal at an optical translation unit in each of the input optical fiber and the output optical fiber. The optical translation units are operable for regenerating the optical signals transmitted through the fibers.

11 Claims, 2 Drawing Sheets

OPTICAL MONITORING FOR OXC FABRIC

BACKGROUND OF THE INVENTION

1. Field of the Invention

The present invention relates to an Optical Crossconnect (OXC) fabric for connecting an optical signal in an input fiber to an output fiber and that includes an array of I/O fibers, an array of tiltable mirrors, and a reflector.

2. Description of the Related Art

An Optical Crossconnect (OXC) device comprises an array of lenses, a corresponding array of mirrors, and a reflector. An array of I/O fibers which corresponds to the array of lenses is received in the device so that the array of mirrors corresponds to the array of I/O fibers. Each of the mirrors is tiltable about 2 axes for directing an input signal received from its corresponding I/O fiber (i.e. an input fiber) against the reflector to another mirror and to an output one of the I/O fibers, thereby signally connecting the input fiber to the output fiber and functioning as a switch.

To ensure proper positioning of the mirrors for optimizing the connection of the optical signal from the input I/O fiber to the output I/O fiber, optical taps are formed in each of the I/O fibers for monitoring the optical signals and ensuring that the output signal approximates the input signal. If a difference between the input and output signals exceeds a threshold value, the mirror positions are adjusted to optimize the output signal. A problem with this arrangement is that the optical taps direct a portion of the optical signal away from the I/O fiber. Furthermore, OXCs typically include arrays of approximately 256 fibers and mirrors. Accordingly, the optical taps add considerable cost to the OXC because they are required for each of the I/O fibers.

SUMMARY OF THE INVENTION

The present invention uses signals present in an optical translation unit to monitor the mirror position and maintain optimal performance of an optical crossconnect (OXC) device. After an optical signal is transmitted from its source to the OXC device, it is generally degraded from its original form and amplitude due to attenuation and other losses and/or disturbances that it may receive or that are present along its path. For this reason, each I/O fiber includes an optical translation unit (OTU) which detects the incoming signal and regenerates the signal to its proper intensity and form. To accomplish this task, the OTU converts the optical signal to an electrical signal, performs the regeneration on the electrical signal, and transforms the regenerated electrical signal into an optical signal for continued transmission of the optical signal to the OXC fabric. Although the OTU is not a part of the OXC fabric and is typically controlled separately therefrom, the electrical signal present in the OTU can be used instead of an optical tap connected to the optical fiber to control the mirror position, because that electrical signal in the OTU represents the optical signal that is transmitted to the OXC fabric. Since the presence of an OTU in the fibers is required to ensure signal quality, the use of the OTU for control of the mirror position reduces the number of required parts for the OXC and thereby does not significantly add to the cost of manufacture.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE CURRENTLY PREFERRED EMBODIMENTS

Figure 1:
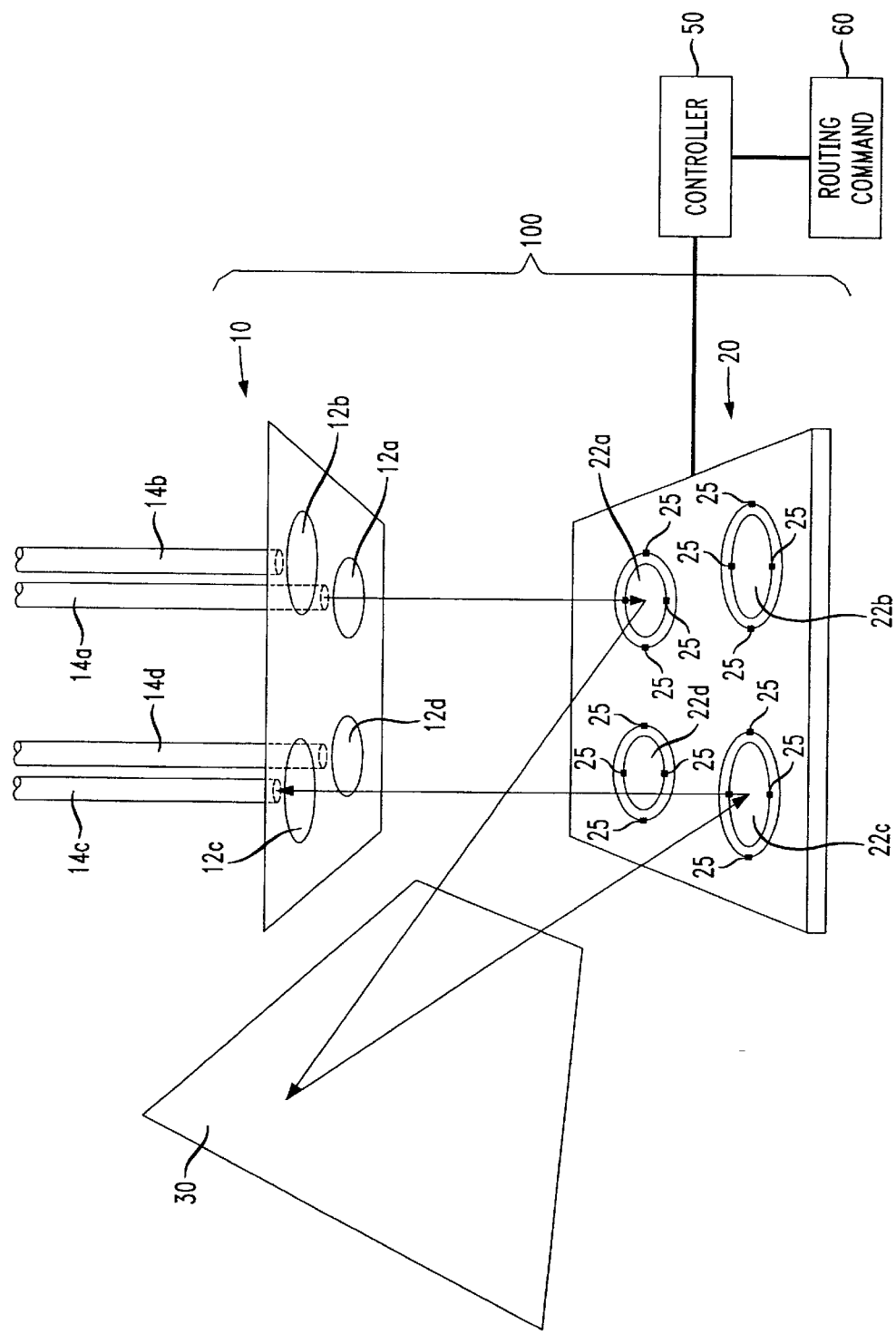
FIG. 1 is an elevated perspective view of an Optical Crossconnect (OXC) according to the present invention.

Referring to FIG. 1, an Optical Crossconnect (OXC) fabric 100 comprises an array of imaging lenses 10, a mirror array 20, and a reflector 30. The OXC 100 is typically formed using Micro Electro-Mechanical Systems (MEMS) technology. The array of imaging lenses 10 comprises lenses 12a–12d respectively aligned with I/O fibers 14a–14d. The mirror array 20 includes a plurality of mirrors 22a–22d respectively corresponding to the I/O fibers 14a–14d. The lenses 12a–12d respectively correspond to the I/O fibers 14a–14d for focussing the optical signals transmitted between the I/O fibers 14a–14d and the respective mirrors 22a–22d of the mirror array 20. To simplify the drawing and for ease of explanation of its operation, the OXC fabric 100 of FIG. 1 is shown as having four I/O fiber and mirrors. However, the OXC fabric may include any number of I/O fibers and mirrors and more typically includes a 16×16 array of 256 fiber and mirrors.

Each mirror 22a–22d of the mirror array 20 is connected to a controller 50 which controls the tilt of the mirrors for routing a signal from one I/O fiber to another. The mirrors 22a–22d are formed using MEMS technology with a two axis flexure gimbal mount via torsion springs 25 so that each mirror 22a–22d can be tilted +/−5 degrees on each axis in response to a voltage signal. For example, if an input signal on I/O fiber 14a is to be routed to I/O fiber 14c, the mirrors 22a and 22c are tilted so that the signal is reflected off of mirror 22a and directed toward reflector 30, reflected off the reflector and directed toward mirror 22c, and reflected off of mirror 22c and directed to the I/O fiber 14c. This particular routing example is depicted in FIG. 1. In this manner, any two I/O fibers may be signally connected.

Figure 2:
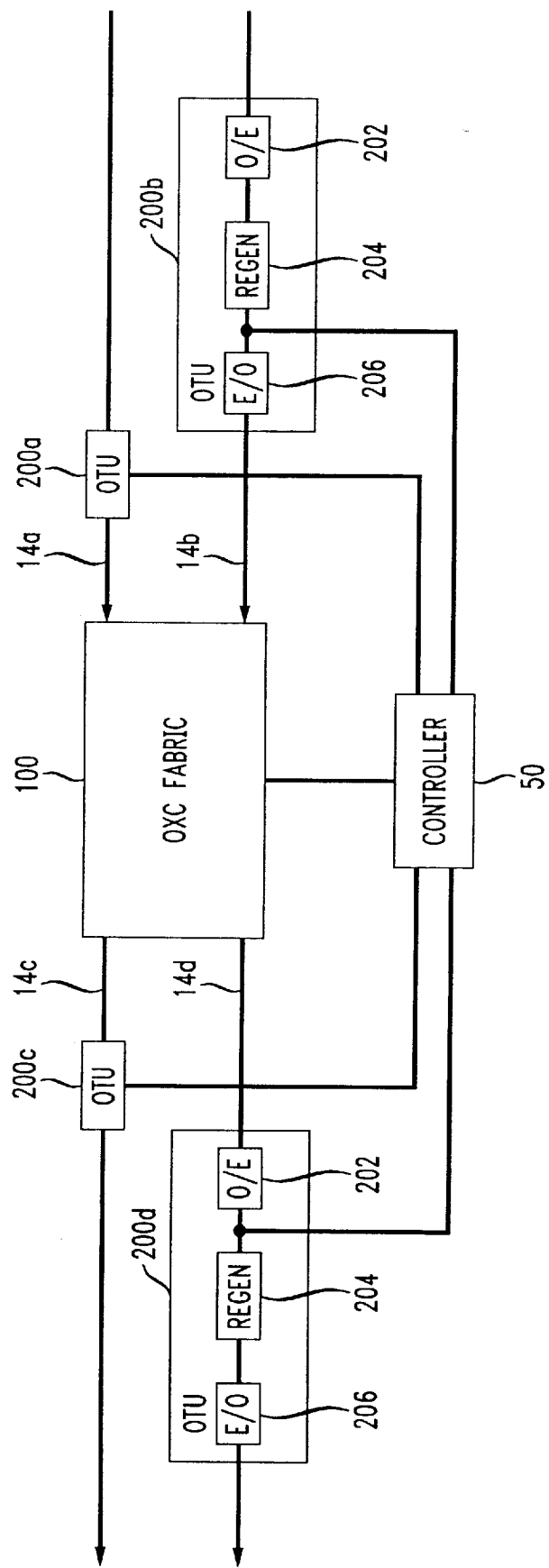
FIG. 2 is a block diagram showing the control arrangement for the present invention.

FIG. 2 is a block diagram showing the connection of the I/O fibers 14a–14d to the OXC fabric 100. Each of the I/O fibers 14a–14d may be used as either an input fiber or an output fiber. However, as a practical matter some are defined as input fibers and others as output fibers. In FIG. 2, I/O fibers 14a and 14b are input fibers and the I/O fibers 14c and 14d are output fibers. Before entering the OXC Fabric 100, each input I/O fiber 14a–14b runs through a respective Optical Translation Unit (OTU) 200a–200b which is connected to the controller 50. The primary function of the OTU 200a–200b is to act as a buffer element for the optical signal and, more specifically, as a regeneration unit for regenerating the optical signal in the fiber. When an optical signal travels through a long length of optical fiber, the original optical signal is attenuated and may be adversely affected in other ways such, for example, as via a phase shift and/or a frequency variation due to various external influences. Accordingly, the OTU 200a–200b on the input I/O fibers 14a–14b converts the received optical signal into an electrical signal, regenerates the electrical signal back to its original intensity and form, and converts the regenerated electrical signal back into an optical signal. The regenerated signal is then transmitted to the OXC fabric 100. The output I/O fibers 14c–14d also have respective OTUs 200c–200d which perform the same function. If some degradation of the signal occurs in the OXC, the OTU 200c, 200d will clean-up the signal by restoring the correct intensity and form before the signal is transmitted externally.

As stated above, the mirror positions are controlled by a controller 50 in response to a routing command 60 from an external source. Basically, the routing command instructs the controller as to which output fiber to connect to an input fiber. The routing command 60 may be a leading command received on an input fiber or may be received from some other external source. Upon receipt of the command, the controller 50 performs a coarse adjustment of the mirrors to put the mirrors into proper position. However, to optimize the position of the mirrors so that the optical signal is optimally connected between the input fiber and the output fiber, the positions of the mirrors are monitored. This is accomplished indirectly by monitoring and comparing the optical signals in the input fiber and output fiber. For this purpose, the controller 50 is connected to the OTUs 200a–200d and the controller monitors the signal sent to the OXC fabric in the input fiber and the signal exiting the OXC fabric in the output fiber. More specifically, the controller 50 is connected to the electrical signal present in each OTU which represents the optical signal that is sent to, in the case of the input fiber 14a–14b, or received from, in the case of the output fiber 14c–14d, the OXC 100. The controller 50 then compares the input signal to the output signal. If the difference between the values of the optical signal in the output fiber and the input fiber exceeds a threshold value, the controller 50 adjusts the position of the mirrors in an attempt to correct or minimize the difference between the signals.

As mentioned above, the OTUs 200a–200d are required components in an OXC 100 for assuring signal quality. Accordingly, connecting the controller 50 to the OTU to provide the control signal for determining the correct mirror position does not require the addition of any further components to the OXC fabric 100.

FIG. 2 additionally shows a detailed view of OTU 200b on the input fiber 14b of the I/O fibers and a detailed view of OTU 200d on the output fiber 14d. Each OTU 200a–200d includes an Optical-to-Electrical converter 202, a regeneration device 204, and an Electrical-to-Optical converter 206. The connection in the OTUs 200a–200b of the input fibers 14a, 14b is made at the point at which the electrical signal is connected to the Electrical-to-Optical converter 206. An electrical connection in the OTUs 200c–200d of the output fiber 14c, 14d is made at the point at which the electrical signal is connected to the Optical-to-Electrical converter 202. The electrical signals are thereby connected to the controller 50 and monitored for each I/O fiber. Accordingly, when an optical signal is being transmitted from one fiber to another in the OXC, the controller 50 monitors the signals in the input and output fibers to determine if the signal is being optimally transmitted and to adjust the mirrors accordingly.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An optical crossconnect device, comprising:
   an input fiber;
   an output fiber;
   an array of tiltable mirrors comprising a plurality of mirrors, each mirror being tiltable about at least one tilting axis for directing a signal received from said input fiber to said output fiber;
   a controller operatively connected to said array of tiltable mirrors for positioning said mirror of said array of tiltable mirrors about said at least one tilting axis so that an input signal received from said input fiber is directed toward said output fiber; and
   an input buffer connected to said input fiber and an output buffer connected to said output fiber, said controller being connected to said input buffer and to said output buffer for monitoring an input optical signal transmitted from said input fiber to said array of mirrors and for monitoring an output optical signal received by said output fiber from said array of mirrors, and said controller being operatively connected to said array of mirrors for operatively adjusting a position of said mirror of said array of mirrors in response to a monitored difference between said input optical signal in said input buffer and said output optical signal in said output buffer.

2. The device of claim 1, wherein said input buffer comprises an input optical translation unit connected to said input fiber for regenerating an optical signal in said input fiber and said output buffer comprises an output optical translation unit for regenerating an optical signal in said output fiber.

3. The device of claim 2, wherein each of said input optical translation device and said output optical translation device comprises an optical-to-electrical converter for converting an optical signal to an electrical signal, a regeneration unit for receiving the electrical signal and regenerating the electrical signal, and an electrical-to-optical converter to converting the regenerated signal back to an optical signal.

4. The device of claim 3, wherein said controller is connected to said electrical signal in said input optical translation device between said regeneration unit and said electrical-to-optical converter and said controller is connected to said electrical signal in said output optical translation device between said optical-to-electrical converter and said regeneration unit.

5. The device of claim 1, wherein said input fiber comprises an array of input fibers and said output fiber comprises an array of output fibers.

6. The device of claim 1, wherein said array of tiltable mirrors comprises a plurality of tiltable mirrors, each of said tiltable mirrors being rotatable about two relatively perpendicular axes.

7. The device of claim 1, wherein said controller is connected for receiving a routing command and includes means for coarsely adjusting said mirrors of said array of mirrors in response to said routing command and for finely adjusting a position of said mirrors of said array of mirrors in response to the monitored difference between said input optical signal in said input buffer and said output optical signal in said output buffer.

8. The device of claim 1, further comprising a reflector, wherein said tiltable mirrors are positionable so that the input signal received from said input fiber is directed toward said output fiber via said reflector.

9. A method of controlling a mirror position in a optical crossconnect fabric comprising an array of tiltable mirrors, said optical crossconnect fabric receiving a plurality of I/O fibers each including an optical translation unit for regenerating an optical signal, wherein said tiltable mirrors are operable for directing the optical signal from an input one of the plurality of I/O fibers to an output one of the plurality of I/O fibers, said method of controlling a mirror position comprising the steps of:

monitoring a level of an optical signal being transmitted to the array of tiltable mirrors in the optical translation unit from the input one of the plurality of fibers;

monitoring a level of an optical signal directed from the array of tiltable mirrors in the optical translation unit to the output one of the plurality of fibers;

comparing the monitored input optical signal to the monitored output optical signal to calculate a difference between the monitored input optical signal and the monitored output optical signal;

determining whether the calculated difference between the monitored input optical signal and the monitored output optical signal is greater than a predetermined threshold level; and adjusting the array of mirrors to minimize the calculated difference between the monitored input optical signal and the monitored output optical signal if it is determined in said step of determining that the calculated difference between the monitored input optical signal and the monitored output optical signal is greater than the threshold level.

10. The method of claim 9, wherein the optical translation units each include an optical-to-electrical converter for converting the optical signal into an electrical signal, and wherein each of said steps of monitoring a level of an optical signal from the input one of the plurality of fibers and of monitoring a level of an optical signal directed to the output one of the plurality of fibers includes monitoring the electrical signal in the optical translation units.

11. The method of claim 9, wherein said step of adjusting the array of mirrors comprises coarsely adjusting the array of mirrors in response to an external routing command and finely adjusting said array of mirrors in response to the calculated difference between the monitored input optical signal and the monitored output optical signal.

* * * * *